US009279682B2

(12) United States Patent
Renault et al.

(10) Patent No.: US 9,279,682 B2
(45) Date of Patent: Mar. 8, 2016

(54) INERTIAL UNIT HAVING VIBRATING GYROS MOUNTED ON A CAROUSEL, AND AN ANGLE-MEASUREMENT METHOD

(71) Applicant: SAGEM DEFENSE SECURITE, Paris (FR)

(72) Inventors: Alain Renault, Paris (FR); Christian Lignon, Paris (FR); Etienne Brunstein, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 204 days.

(21) Appl. No.: 13/901,144

(22) Filed: May 23, 2013

(65) Prior Publication Data

US 2013/0312518 A1    Nov. 28, 2013

(30) Foreign Application Priority Data

May 24, 2012    (FR) ...................................... 12 01487

(51) Int. Cl.
| | |
|---|---|
| *G01C 19/56* | (2012.01) |
| *G01P 1/02* | (2006.01) |
| *G01C 19/04* | (2006.01) |
| *G01C 19/5691* | (2012.01) |

(52) U.S. Cl.
CPC ............ *G01C 19/04* (2013.01); *G01C 19/5691* (2013.01); *G01P 1/02* (2013.01)

(58) Field of Classification Search
CPC .... G01C 19/5719; G01C 19/28; G01C 19/42; G01C 19/5607; G01C 19/56; G01C 19/5691; G01C 19/04; G01P 15/18; G01P 15/093; G01P 15/08; G01P 9/04; G01P 1/02

USPC ................. 73/504.08, 493, 510, 511, 504.12
See application file for complete search history.

(56) References Cited

U.S. PATENT DOCUMENTS

| | | | | |
|---|---|---|---|---|
| 4,601,206 | A | * | 7/1986 | Watson ........................... 73/510 |
| 4,711,125 | A | * | 12/1987 | Morrison ..................... 73/178 R |
| 5,038,613 | A | * | 8/1991 | Takenaka et al. ............... 73/510 |
| 5,067,084 | A | * | 11/1991 | Kau ............................... 701/510 |
| 6,128,955 | A | * | 10/2000 | Mimura ........................... 73/510 |
| 6,412,346 | B2 | * | 7/2002 | Barkai et al. ................... 73/493 |
| 7,370,530 | B2 | * | 5/2008 | DCamp et al. .................. 73/493 |
| 7,481,109 | B2 | * | 1/2009 | Moore et al. ............... 73/504.02 |

(Continued)

FOREIGN PATENT DOCUMENTS

FR    2920224    2/2009

OTHER PUBLICATIONS

Shkel, "Type I amd Type II Micromachined Vibratory Gyroscopes", Position, Location, and Navigation Symposium, 2006 IEEE/Ion Coronado, CA, Apr. 25-27, 2006, pp. 586-593.

*Primary Examiner* — Helen Kwok
(74) *Attorney, Agent, or Firm* — Muncy, Geissler, Olds & Lowe, P.C.

(57) ABSTRACT

An inertial unit comprising an inertial core (3) that is connected to a control unit (50) and that includes three gyros (9, 10, 11) that are mounted relative to one another so as to have sensing axes (X, Y, Z) that are substantially perpendicular to one another, the gyros being vibrating axisymmetric gyros with hemispherical resonators, the unit being characterized in that the core is mounted on a carousel (2) arranged to drive the inertial core in rotation about an axis of rotation (4) at at least one frequency that corresponds to a minimum for spectral error density of the gyros. An angle-measurement method making use of the unit.

8 Claims, 1 Drawing Sheet

(56) References Cited

U.S. PATENT DOCUMENTS

| | | | |
|---|---|---|---|
| 7,617,728 B2* | 11/2009 | Cardarelli | 73/504.16 |
| 7,814,791 B2* | 10/2010 | Andersson et al. | 73/504.03 |
| 8,037,754 B2* | 10/2011 | Eriksen et al. | 73/493 |
| 8,079,258 B1* | 12/2011 | Sapuppo | 73/504.02 |
| 8,156,806 B1* | 4/2012 | Cardarelli | 73/511 |
| 8,210,041 B2* | 7/2012 | Ragot | 73/504.12 |
| 8,397,568 B2* | 3/2013 | Cardarelli | 73/504.12 |
| 2010/0063763 A1 | 3/2010 | Rozelle | |

* cited by examiner

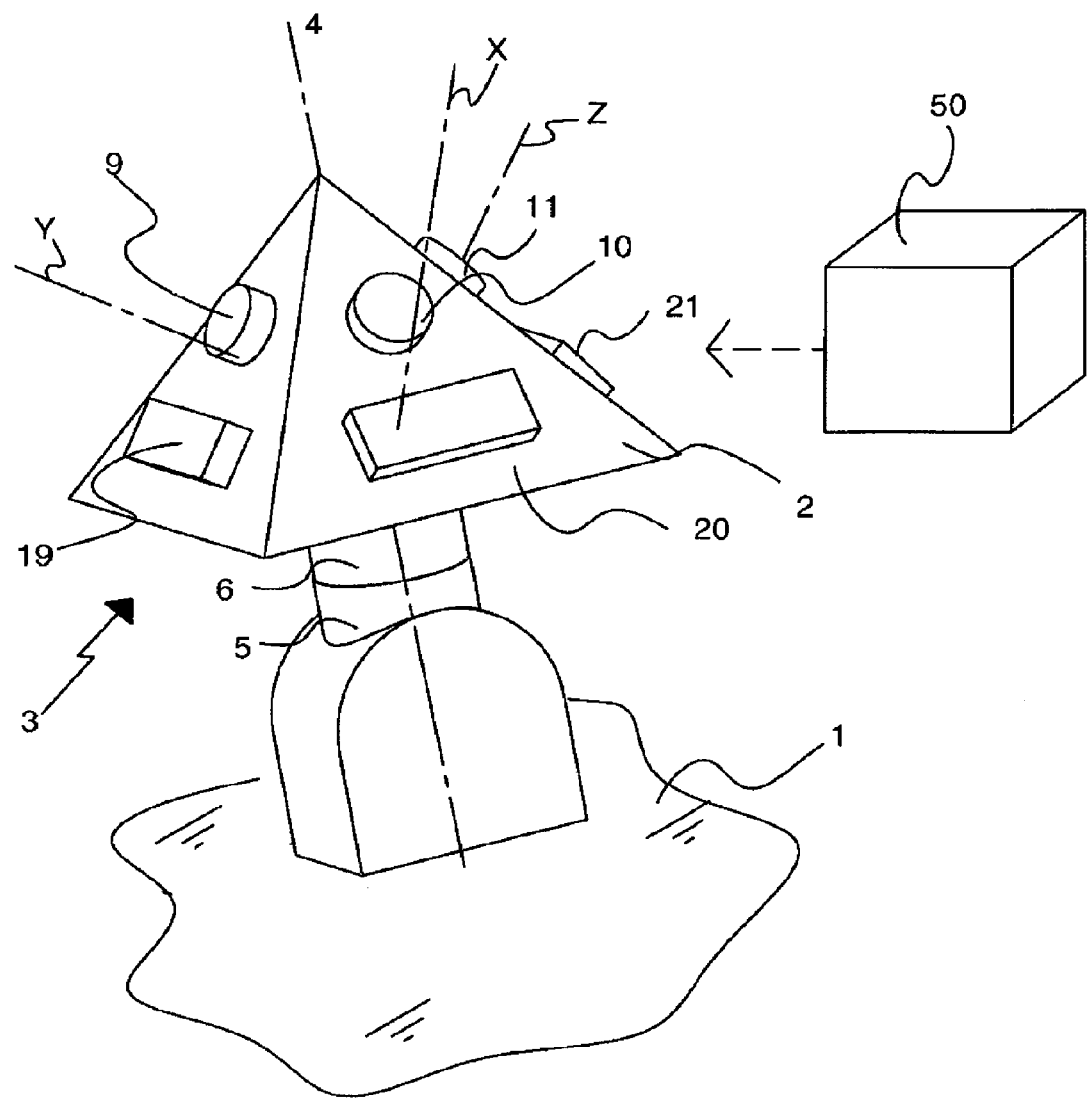

INERTIAL UNIT HAVING VIBRATING GYROS MOUNTED ON A CAROUSEL, AND AN ANGLE-MEASUREMENT METHOD

BACKGROUND OF THE INVENTION

1. Field of the Invention

The present invention relates to an inertial unit for mounting on a vehicle. The vehicle may be a land vehicle, an aircraft, or a ship, for which navigation requires knowledge of the position, the speed, and the attitude (heading, roll, and pitching) of the vehicle. The invention also relates to an angle-measurement method.

2. Brief Description of the Related Art

A modern inertial navigation unit generally has an inertial core. The inertial core has inertial sensors such as gyros and accelerometers that are arranged on the axes of a measurement reference frame. The gyros measure angular rotations of the measurement reference frame relative to a geographical reference frame and provide the attitude of the vehicle in the geographical reference frame. The accelerometers measure accelerations that are projected onto the geographical reference frame and then integrated a first time to provide the speed of the vehicle, and then a second time to provide its position. The accuracy of an inertial navigation unit depends directly on the errors of the inertial sensors, and more precisely on the projections of these errors onto the local geographical reference frame; and when performing inertial navigation over a long duration, the position errors depend for the most part on the accuracy of the gyros. The accuracy of the gyros is affected by drift errors (shifting of the measurement origin, such that a zero magnitude is then not measured at zero), by scale factors (scale factor error is an error concerning the coefficient by which a measurement should be multiplied), and by the positioning of the axes (orthogonality error between the measurement axes).

In inertial cores, it is known in particular to make use of vibrating-resonator gyros. Vibrating gyros are axisymmetric Coriolis vibratory gyroscopes (CVG), e.g. having a hemispherical resonator (i.e. a hemispherical resonator gyroscope (HRG)), and they are more generally said to be "type I" as in the document "Type I and type II micromachined vibratory gyroscopes" by Andrei M. Shkel, pp. 586-593, IEEE/ION (Institute of Electrical and Electronics Engineers/Institute of Navigation) PLANS 2006, San Diego, Calif., USA. Such gyros operate either in an open loop, in which ease they serve to measure an absolute angle of rotation on the basis of measuring an angle representing the position of the vibration of the resonator relative to measurement electrodes (electric angle), or else in a closed loop, in which case they serve to measure a speed of rotation on the basis of a measurement of the electric current needed to maintain the electric angle at a given value. The measurements provided by such vibrating gyros may be affected by errors that are essentially a function of the position of the vibration relative to the measurement electrodes. These errors are thus variable as a function of the position of the vibration as represented by the electric angle.

In order to improve the accuracy of such inertial units, it is common practice to use gyros presenting the best possible performance. Nevertheless, such gyros are relatively expensive.

SUMMARY OF THE INVENTION

An object of the invention is to provide means making it possible to improve the accuracy of inertial units while keeping costs down.

To this end, the invention provides an inertial unit comprising an inertial core that is connected to a control unit and that includes three gyros that are mounted relative to one another so as to have sensing axes that are substantially perpendicular to one another, the gyros being vibrating axisymmetric gyros with hemispherical resonators. The core is mounted on a carousel arranged to drive the inertial core in rotation about an axis of rotation at at least one predetermined frequency of rotation.

The vibration associated with the gyro that is oriented substantially along the axis of rotation thus rotates because of the rotation of the inertial core. Since drifts are mainly sinusoidal functions of electric angle (or of a multiple thereof), it is possible during rotation to eliminate a large part of the drift error of the gyro that is oriented along the axis of rotation. This makes it possible to improve the performance of an inertial unit at a cost that is relatively small, which is particularly advantageous for low-cost inertial units.

Likewise, the electric angles of the gyros that are oriented substantially perpendicularly to the axis of rotation are unaffected by the rotation and as a result the drift of these gyros do not vary in the measurement reference frame. In contrast, because of the rotation, the projection of the drifts of said gyros in a terrestrial geographical reference frame will present spectral density that is at a minimum at the frequency of rotation about the axis of rotation.

The physical rotation of the gyros thus makes it possible to average out the errors on each of the axes of the gyroscopic reference frame without affecting the internal operating parameters of the gyros.

This method also extends to circumstances in which the positioning of the axes of the gyros is arbitrary relative to the axis of rotation. Under such circumstances, the drifts of each of the gyros vary sinusoidally at frequencies that depend on the angle of the measurement axis of each of said gyros relative to the axis of rotation. The averaging of the projections of the drifts of each of the gyros along the axis of rotation then takes place at the frequency that corresponds to one revolution of their respective electric angles. The averaging of the drift of each of the gyros in the plane perpendicular to the axis of rotation then takes place at a frequency that is a submultiple both of the frequency at which the electric angles of each of the gyros vary and of the frequency of the axis of rotation.

The invention also provides an angle-measurement method making use of an inertial unit in accordance with the invention, the method comprising the steps of:
  causing the carousel to rotate about the axis of rotation; and
  taking measurements with each gyro during rotation of the carousel.

Other characteristics and advantages of the invention appear on reading the following description of a particular, non-limiting embodiment of the invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The sole FIGURE is a diagrammatic perspective view of an inertial unit in accordance with the invention.

DETAILED DESCRIPTION OF THE PREFERRED EMBODIMENTS

With reference to the FIGURE, the inertial unit of the invention comprises a platform 1 enabling the inertial unit to be fastened to a vehicle such as a ship or an aircraft. The platform 1 supports a carousel 2 carrying an inertial core 3 that is associated with a reference frame having three axes X, Y, and Z. The inertial unit is arranged to determine the orientation of this reference frame relative to three axes of a stationary inertial reference frame having an origin that may be arbitrary, e.g. the center of the earth in this example. Two of the axes of the inertial reference frame are oriented in a plane that is substantially horizontal, and the third axis is oriented substantially vertically in an upward direction.

The inertial core 3 comprises three gyros 9, 10, and 11 and three accelerometers 19, 20, and 21. The gyros 9, 10, and 11 are axisymmetric vibrating gyros, each comprising a resonator that is sustained in vibration and that serves to measure angle by detecting a position of the vibration about an axis of the resonator (electric angle). The resonator is hemispherical (a gyro of the HRG type).

The accelerometer 19 measures accelerations of the inertial core 3 in the direction of the Y axis and the gyro 9 measures rotations of the inertial core 3 about the Y axis. The accelerometer 20 measures accelerations of the inertial core 3 along the X axis and the gyro 10 measures rotations of the inertial core 3 about the X axis. The accelerometer 21 measures accelerations of the inertial core 3 along the Z axis and the gyro 10 measures rotations of the inertial core 3 about the Z axis. It is then possible to calculate the accelerations of the vehicle relative to the axes of the inertial reference frame by deduction from the measured accelerations, and then by integration to calculate the speed of the vehicle, and by a second integration to calculate its position in the inertial reference frame.

The carousel 2 is mounted on the platform 1 to rotate about an axis of rotation 4. For this purpose, the carousel 2 is secured to a pin suspended on magnetic bearings in order to limit friction. A motor 5 serves to rotate the carousel 2. The axis of rotation 4 in this example is other than a trisector of the sensing axes (X, Y, and Z). More precisely, the axis of rotation 4 is such that the gyros 9, 10, and 11 present errors that appear at frequencies that are not identical, and the frequencies at which gyro errors appear are not harmonics of one another.

A coder 6 is mounted on the platform 1 to detect the angular position of the pin.

The navigation device has a control unit shown diagrammatically at 50 that is programmed to control the inertial core 3 and to perform the measurement method of the invention.

The control unit 50 is connected to the inertial sensors, to the coder 6, and to the motor 5 for rotating the carousel 2 in order to control them.

The control unit 50 is arranged to cause the carousel to rotate continuously. Under such circumstances, the three-axis system formed by the gyros 9, 10, and 11 must present a scale factor error that is as small as possible when projected onto the axis of rotation 4, in particular when the axis of rotation 4 is vertical.

In a variant, it is possible to program the control unit 50 to drive the carousel with alternating rotary motion. Such alternating rotary motion makes it possible to eliminate errors due to scale factor. From this point of view, alternating rotary motion is more advantageous than continuous rotary motion since it does not put constraints on the quality of the scale factor of the gyroscopic axis system. However, there is a risk that the rotary motion of the carousel 2 will correspond to the movement of the carrier vehicle. This risk can be eliminated if care is taken to control the rotary motion at a rate that is greater than the rate at which the carrier moves (e.g. by a factor of at least 3).

The control unit 50 is also programmed to take angle measurements by using the gyros 9, 10, and 11 during the rotation of the carousel 2.

The method performed by the control unit 50 comprises more specifically the steps of:

causing the carousel 2 to rotate about the axis of rotation 4; and taking measurements with each of the gyros 9, 10, and 11 during the rotation of the carousel 2.

The rotation frequency is selected to enable gyro errors to be averaged over a time horizon, i.e. on a minimum for the spectral error density of the gyros 9, 10, and 11.

It can be understood that during a navigation stage the rotation of the carousel 2 enables the errors of the gyros 9, 10, and 11 to be averaged, providing the rotation frequency is selected to be greater than the rate at which the carrier can turn (e.g. by a factor of 3).

Since the orientation of the axis of rotation 4 relative to the gyros 9, 10, and 11 is selected so that the gyros 9, 10, and 11 have errors that do not appear at frequencies that are identical, and since the frequencies at which errors of the gyros 9, 10, and 11 appear are not harmonics of one another, it is possible to perform a calibration stage during which the gyros 9, 10, and 11 that are responsible for the errors are identified as a function of the frequencies at which they appear. Each detected error is thus allocated to the corresponding gyro 9, 10, or 11. The measurements coming from each of the gyros 9, 10, or 11 can thus be corrected in order to improve the accuracy of the inertial unit.

The axis of rotation is preferably oriented in two different orientations depending on whether a calibration stage or a navigation stage is being performed.

During calibration, the vehicle may be stationary and the carousel 2 is positioned so that the axis of rotation 4 coincides with a vertical axis. The errors that arise can then be compensated more easily since in theory no movement should be detected in the horizontal plane.

During calibration, the vehicle may also be moving. If this movement is measured by some other means (log, global positioning system (GPS), . . . ), it is also possible to compensate for errors that appear in the horizontal plane.

In a navigation stage, the carousel 2 may be positioned so that the axis of rotation is horizontal. This position is advantageous since the rotation of the carousel 2 then has no effect on determining heading, thus making it pointless to have a very accurate coder 6 in order to detect the pivot angle of the gyros 9, 10, and 11 relative to the vehicle.

It should be observed that the measurement operation performed by the gyros 9, 10, and 11 may either be continuous or repeated.

Naturally, the invention is not limited to the embodiments described but covers any variant coming within the ambit of the invention as defined by the claims.

In particular, a different orientation may be selected for the axis of rotation 4. For example, during a navigation stage, it may be selected to orient the axis of rotation 4 vertically. It is then preferable to compensate the heading errors due to scale factor by some other navigation system such as a satellite positioning system of the GPS type. It is also preferable to cause the carousel 2 to perform alternating rotary motion.

The inertial unit need not include accelerometers, e.g. if it is for use on board a satellite.

In a variant, the axis of rotation 4 may be positioned differently relative to the gyros, and may for example coincide with a trisector of the sensing axes (X, Y, and Z).

Errors may be allocated to the gyros responsible for those errors while performing a navigation stage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inertial unit comprising an inertial core that is connected to a control unit and that includes three gyros that are mounted relative to one another so as to have sensing axes that are substantially perpendicular to one another, the gyros being vibrating axisymmetric gyros with hemispherical resonators, wherein the inertial core is mounted on a carousel arranged to drive the inertial core in rotation about an axis of rotation at at least one predetermined frequency of rotation and wherein the axis of rotation coincides with a trisector of the sensing axes.

2. An inertial unit according to claim 1, wherein the carousel is arranged to cause the inertial core to perform continuous rotary motion.

3. An inertial unit according to claim 1, wherein the carousel is arranged to cause the inertial core to perform alternating rotary motion.

4. An inertial unit according to claim 1, wherein the carousel is positioned so that the axis of rotation is vertical.

5. An inertial unit according to claim 1, wherein the carousel is positioned so that the axis of rotation is horizontal.

6. An angle-measurement method making use of the inertial unit in accordance with any one of claims 1 and 2-5, the method comprising the steps of:
   causing the carousel to rotate about the axis of rotation; and
   taking measurements with each gyro during rotation of the carousel.

7. A method according to claim 6, wherein a measurement operation is performed continuously during rotation.

8. A method according to claim 6, wherein the axis of rotation is such that the gyros have errors that appear at frequencies that are not identical and the frequencies at which the gyro errors appear are not harmonics of one another, and wherein a step is performed of allocating errors to the gyros as a function of the frequencies at which the errors appear.

* * * * *